US010318982B2

(12) United States Patent
Karande et al.

(10) Patent No.: US 10,318,982 B2
(45) Date of Patent: Jun. 11, 2019

(54) BIASING SELECTION OF ADVERTISEMENTS FROM AN ADVERTISEMENT CAMPAIGN

(71) Applicant: Facebook, Inc., Menlo Park, CA (US)

(72) Inventors: Chinmay Deepak Karande, Mountain View, CA (US); Joaquin Ignacio Quinonero Candela, Palo Alto, CA (US); Yaron Greif, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 866 days.

(21) Appl. No.: 14/158,638

(22) Filed: Jan. 17, 2014

(65) Prior Publication Data

US 2015/0206170 A1  Jul. 23, 2015

(51) Int. Cl.
 *G06Q 30/00* (2012.01)
 *G06Q 30/02* (2012.01)
 *G06Q 50/00* (2012.01)

(52) U.S. Cl.
 CPC ..... *G06Q 30/0242* (2013.01); *G06Q 30/0249* (2013.01); *G06Q 30/0275* (2013.01); *G06Q 50/01* (2013.01)

(58) Field of Classification Search
 None
 See application file for complete search history.

(56) References Cited

U.S. PATENT DOCUMENTS

| 2004/0015998 A1* | 1/2004 | Bokor | H04N 7/17318 725/136 |
| 2006/0190328 A1* | 8/2006 | Singh | G06F 17/30864 705/14.46 |
| 2013/0085865 A1* | 4/2013 | Zhou | G06Q 30/02 705/14.66 |

* cited by examiner

*Primary Examiner* — Michael W Schmucker
(74) *Attorney, Agent, or Firm* — Fenwick & West LLP

(57) ABSTRACT

For ad campaigns that have multiple advertisements, each associated with an ad creative, which are automatically selected, an online system may bias selection of advertisements away from underestimated advertisements and towards early-selected advertisements with positive user interactions. To increase the likelihood of various advertisements in an ad campaign being evaluated for presentation to users, the online system may: associate a relatively high performance score with each advertisement in an ad campaign, randomly select advertisements from an ad campaign, modify bid amounts associated with advertisements in the ad campaign, or allocate a portion of the ad campaign's budget for allocation across advertisements in the ad campaign. After presenting a threshold number of advertisements in an ad campaign or receiving an instruction from an advertiser, advertisements from the ad campaign may be selected using conventional methods.

17 Claims, 3 Drawing Sheets

US 10,318,982 B2

BIASING SELECTION OF ADVERTISEMENTS FROM AN ADVERTISEMENT CAMPAIGN

BACKGROUND

This disclosure relates generally to advertising via social networking systems, and more specifically to selecting advertisements for presentation to social networking system users.

A social networking system, or other suitable online system, allows its users to connect to and communicate with other social networking system users. Users may create profiles on a social networking system that are tied to their identities and include information about the users, such as interests and demographic information. The users may be individuals or entities such as corporations or charities. Because of the increasing popularity of social networking systems and the increasing amount of user-specific information maintained by social networking systems, a social networking system provides an ideal forum for advertisers to increase awareness about products or services by presenting advertisements to social networking system users.

Presenting advertisements to social networking system users allows an advertiser to gain public attention for products or services or to persuade online users to take an action regarding the advertiser's products or services. Additionally, many social networking systems generate revenue by displaying advertisements to their users. Frequently, social networking systems charge advertisers for each presentation of an advertisement to a social networking system user (e.g., each "impression" of the advertisement) or interaction with an advertisement by a social networking system user.

Conventionally, an advertiser provides an advertisement campaign to a social networking system. The advertisement campaign often includes multiple advertisements having various advertisement creatives for presentation to social networking system users. Additionally, the advertisement campaign includes a budget specifying a total amount of compensation from the advertiser to the social networking system for presenting advertisements in the advertisement campaign and bid amounts and other information for use by the social networking system in selecting advertisements. The budget is also a maximum amount willing to be spent by an advertiser for presenting the advertisements in the advertisement campaign. Conventional social networking systems select advertisements from an advertisement campaign based on performance or expected performance of the advertisements when presented to users of the social networking system. However, this often causes a social networking system to continually select advertisements with a threshold performance, which may prevent selection of advertisements in an advertisement campaign that have received a limited amount of user interaction.

SUMMARY

A social networking system receives an advertisement ("ad") campaign including multiple advertisements from an advertiser. Each advertisement includes an ad creative that identifies content presented to a social networking system user when the advertisement is presented. Additionally, the ad campaign may include information describing presentation of ad creatives to users of the social networking system, such as a budget specifying an amount of compensation received by the social networking system for presenting advertisements in the ad campaign. In some embodiments, an objective associated with presenting advertisements is also included in the ad campaign. One or more advertisements in the ad campaign may have been presented to less than a threshold number of social networking system users; for example, new advertisements in the ad campaign have not been presented to the threshold number of social networking system users.

To increase the likelihood of advertisements presented to less than the threshold number of social networking system users being selected for presentation from the ad campaign, the social networking system associates an initial performance score with an ad creative of each advertisement in the ad campaign. An advertisement's performance score provides a measure of the advertisement's expected performance when presented to social networking system users; for example, a performance score provides a measure of an expected amount of interaction with the advertisement by social networking system users or an expected amount of revenue received by the social networking system for presenting the advertisement. Conventionally, a performance score of an advertisement presented to less than a threshold number of users is low, reducing the likelihood of the advertisement being selected for presentation. The performance score of a relatively new advertisement is usually low due to less than a threshold number of users interacting with the advertisement, for example. The associated initial performance score increases the initial performance score associated with advertisements having less than a threshold amount of user interaction, which artificially represents each advertisement as having at least the threshold amount of user interaction. This increases the likelihood of the advertisements with less than the threshold amount of user interaction being selected for presentation by the social networking system.

When an opportunity to present advertisements to a user of the social networking system via a client device is identified, the social networking system selects an advertisement from the ad campaign. The advertisement may be selected based on various criteria. For example, an advertisement is selected based on the initial performance scores of the advertisements, based on random selection of an advertisement, or based on other information associated with the advertisement or ad campaign. The selected advertisement is included in a set of advertisements from various ad campaigns, with advertisements in the set of advertisements evaluated to identify one or more advertisements for presentation to the user. For example, the selected advertisement from the ad campaign is included in an auction based on bid amounts including advertisements from other ad campaigns, and advertisements are selected for presentation to the user. For example, advertisements having at least a threshold position in the auction are sent to a client device for presentation to the user.

In another embodiment, a bid amount is associated with each advertisement in the ad campaign. The social networking system determines an expected value for an advertisement based on its associated bid amount, where the expected value represents the amount of compensation the social networking system receives from an advertiser for presenting the advertisement to a user, for a user interacting with the advertisement when it is presented, or based on any other suitable condition. For example, the expected value represents a maximum compensation the social networking system would receive from an advertiser for presenting the advertisement. In some embodiments, a higher expected value of an advertisement represents a higher likelihood of the social networking system selecting the advertisement for presentation to a user. For an ad campaign, a maximum bid amount is determined from the bid amounts associated with the advertisements in the ad campaign. When an opportunity to present one or more advertisements to a social networking system user is identified, an advertisement is selected from the ad campaign. The social networking system modifies a bid amount associated with the selected advertisement based at least in part on the budget associated with the ad campaign and the determined maximum bid amount. For example, the bid amount is modified to equal the maximum bid amount or is adjusted based on an amount of compensation previously received by the social networking system from an advertiser associated with the ad campaign and the budget associated with the ad campaign (e.g., based on a difference between the budget and the amount of compensation previously received by the social networking system). The bid amount associated with the selected advertisement may also be modified based on an objective associated with the ad campaign and an amount of compensation previously received by the social networking system from an advertiser associated with the ad campaign and the budget associated with the ad campaign. The selected advertisement from the ad campaign, along with its modified bid amount, is included in a set of advertisements from various ad campaigns. One or more advertisements are selected from the set of advertisements for presentation to the user based on the expected values associated with advertisements in the set.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
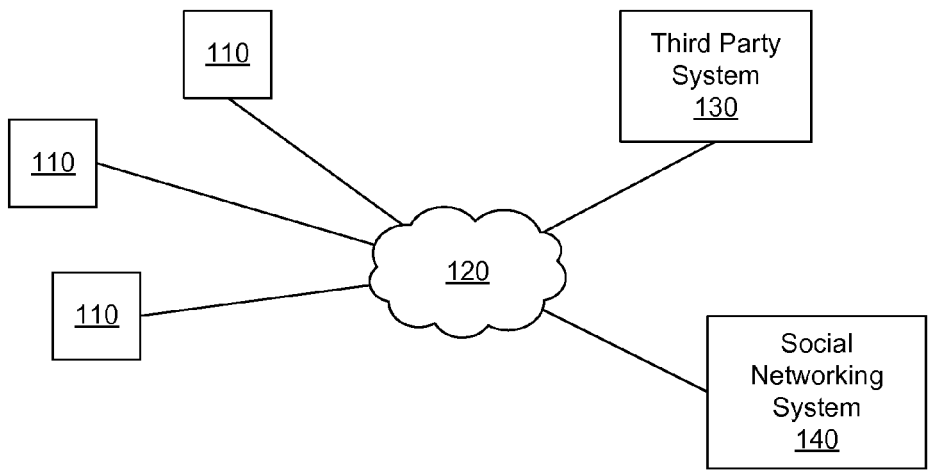
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
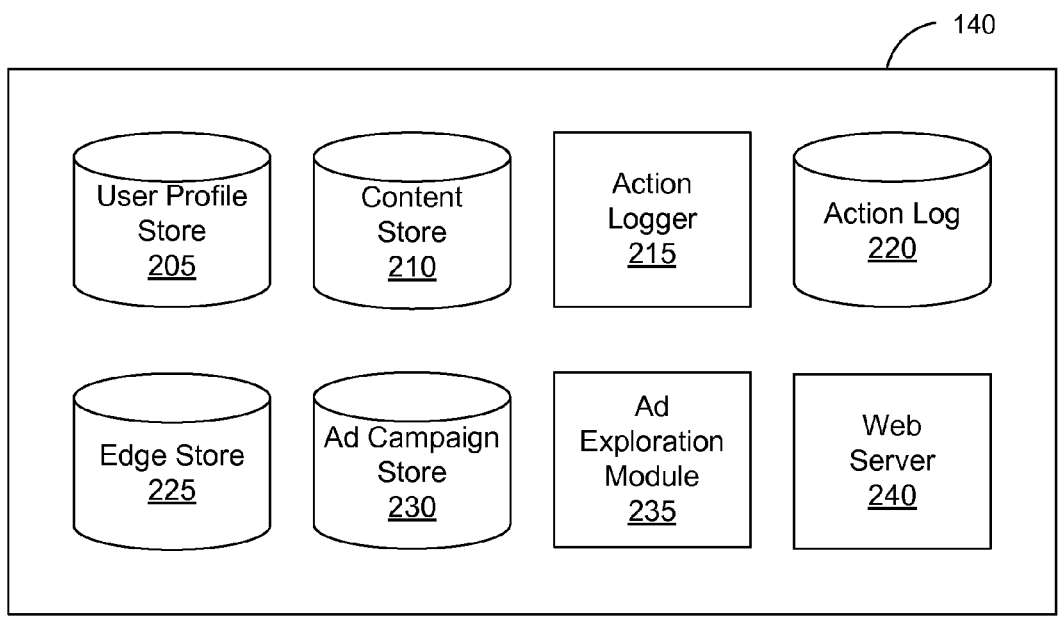
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, an ad campaign store 230, an ad exploration module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture. In various embodiments, the functionality described below may be adapted for use online systems other than a social networking system 140.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement campaigns ("ad campaigns") are included in the ad campaign store 230. An ad campaign includes a plurality of advertisements received from an advertiser for presentation to users of the social networking system 140. Each advertisement includes an advertisement creative ("ad creative"), which is content presented to a social networking system user, such as text data, image data, audio data, video data, or any other suitable data. An advertisement may also associate a destination address with an ad creative to specify a source of content presented to a user that accesses the advertisement when it is presented. For example, the destination address identifies a landing page including content that is presented to the user when the user accesses the advertisement.

Additionally, advertisements in an ad campaign are associated with a bid amount. The bid amount associated with an advertisement specifies an amount of compensation an advertiser provides the social networking system 140 for presenting the advertisement, for a user interacting with the advertisement, or for another suitable interaction with the advertisement by a user. Based on the bid amount associated with an advertisement, the social networking system 140 determines an expected value for presenting the advertisement to a user. For example, the expected value is an amount of monetary compensation received by the social networking system 140 from an advertiser for presenting the advertisement to a user, for a user interacting with the presented advertisement, or based on any other suitable condition. In one embodiment, the expected value of an advertisement is a product of the bid amount and a probability of the advertisement being accessed by the user.

Additionally, advertisements in an ad campaign may be associated with one or more targeting criteria. An advertiser may specify targeting criteria associated with an advertisement in the ad campaign. Targeting criteria specify one or more characteristics of users eligible to be presented with an advertisement associated with the targeting criteria. Associating different targeting criteria with different advertisements in the ad campaign allows an advertiser to tailor presentation of advertisements to users having specific characteristics, allowing advertisements with different ad creatives to be presented to users with different characteristics. For example targeting criteria specify demographic information, connections, or actions associated with a user. In some embodiments, targeting criteria may be associated with the ad campaign in its entirety, so multiple advertisements in the ad campaign are associated with the targeting criteria.

In one embodiment, targeting criteria may specify actions or types of connections between a user and another user or object of the social networking system 140. Targeting criteria may also specify interactions between a user and objects performed external to the social networking system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with advertisements from an ad campaign. As another example, targeting criteria identifies users having a connection to another user or object or having a particular type of connection to another user or object.

Additionally, the ad campaign may include an objective specifying a goal of the advertiser for presentation of advertisements in the ad campaign to social networking system users. For example, the objective identifies a type of interaction with advertisements included in the ad campaign or with one or more objects associated with advertisements in the ad campaign by social networking system users presented with an advertisement from the ad campaign. Examples of objectives include: social networking system users accessing a presented advertisement (e.g., clicking or otherwise accessing the advertisement), social networking system users installing an application associated with the advertisement, social networking system users expressing a preference for a page associated with the advertisement (i.e., "liking" the page), social networking system users viewing a page associated with the ad campaign, or any other suitable action by social networking system users. In one embodiment, the objective is selected from a set of objectives maintained by the social networking system 140.

In some embodiments, the ad campaign includes a performance metric describing a benefit to the advertiser from presenting advertisements included in the ad campaign. The performance metric is based on performance scores associated with various advertisements in the ad campaign. An advertisement's performance score describes an effectiveness of the advertisement in advancing an objective associated with the ad campaign or with the advertisement. A performance score of an advertisement may be a percentage of total interactions with the advertisement satisfying an objective associated with the advertisement or with an ad campaign including the advertisement, a number of interactions with the advertisement satisfying the objective associated with the advertisement of with the ad campaign including the advertisement, or any other suitable value. The performance score is further described in conjunction with FIG. 3. A performance metric of the ad campaign may also be based at least in part on bid amounts associated with advertisements in the ad campaign, a prior performance score of the ad campaign, or other suitable information. For example, the performance metric of the ad campaign increases as a performance score of an advertisement in the ad campaign increases based on user interaction with the advertisement. Similarly, the performance metric of the ad campaign decreases if a performance score of an advertisement in the ad campaign decreases if a user presented with the advertisement hides the advertisement or does not interact with the advertisement when it is presented.

Additional information may be included in the ad campaign. For example, the ad campaign includes a budget that specifies a total amount of compensation an advertiser provides the social networking system 140 for presenting advertisements included in the ad campaign. The budget may be allocated for the ad campaign as a whole or per advertisement. In addition, the advertiser may specify instructions for allocating the budget among the advertisements in the ad campaign. For example, the instructions specify modification of a bid amount associated with an advertisement included in the ad campaign. The instructions may also include other suitable information describing allocation of budget among advertisements included in the ad campaign.

When the social networking system 140 receives an ad request including advertisements, the ad exploration module 235 selects one or more advertisements from the ad campaign for inclusion in a set of advertisements from which one or more advertisements are selected for presentation to a social networking system user. For example, the ad exploration module 235 identifies advertisements from an ad campaign associated with targeting criteria satisfied by one or more characteristics of a user to be presented with an advertisement based on information in the user's user profile stored in the user profile store 205, actions in the action log 220 associated with the user, connections in the edge store 225 associated with the user, or other information associated with the user. The ad exploration module 235 may modify attributes of advertisements included in an ad campaign and selects one or more advertisements from the ad campaign based on the modified attributes. Examples of attributes associated with an advertisement include a bid amount and a performance score. Selecting advertisements from an ad campaign to be evaluated for presentation to a user is further described below in conjunction with FIGS. 3 and 4.

The web server 240 links the social networking system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Selecting Advertisements Based on Advertisement Attributes

Figure 3:
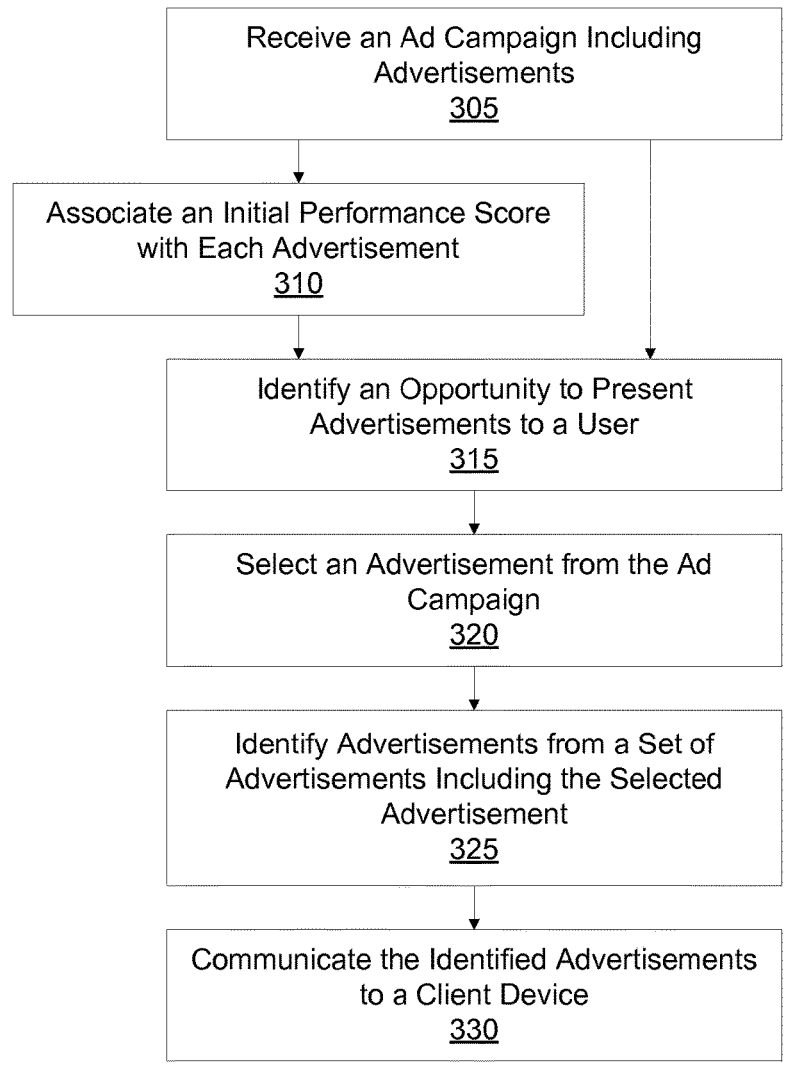
FIG. 3 is a flow chart of a method for selecting an advertisement to evaluate for presentation based in part on the advertisement, in accordance with an embodiment.

FIG. 3 is a flowchart of one embodiment of a method for selecting an advertisement from an ad campaign to evaluate for presentation to a user of the social networking system 140. In various embodiments, the steps described in conjunction with FIG. 3 may be performed in different orders. Additionally, in some embodiments, the method may include different and/or additional steps than those shown in FIG. 3. The functionality described in conjunction with the social networking system 140 in FIG. 3 may be provided by the ad exploration module 235, in one embodiment, or may be provided by any other suitable component, or components, in other embodiments. Additionally, the client device 110 may execute one or more instructions associated with the social networking system 140, such as an application associated with the social networking system 140, to provide the functionality described in conjunction with FIG. 3.

The social networking system 140 receives 305 an ad campaign from an advertiser that includes a plurality of advertisements. As described above in conjunction with FIG. 2, the ad campaign may include an objective, a budget, instructions for allocating the budget among advertisements in the ad campaign, or other suitable information. Additionally, advertisements in the ad campaign include an ad creative specifying content for presentation to social networking system users and may be associated with a bid amount, one or more targeting criteria, or other suitable information. In one embodiment, one or more advertisements in the received ad campaign are associated with less than a threshold amount of interaction by social networking system users. For example, one or more advertisements in the ad campaign have been presented to less than a threshold number of social networking system users or have received less than a threshold number of interactions from social networking system users presented with the one or more advertisements.

In one embodiment, the social networking system 140 associates 310 an initial performance score with each advertisement included in the ad campaign. As described above in FIG. 2, a performance score describes an effectiveness of an advertisement in advancing an objective associated with the ad campaign or with the advertisement. A performance score of an advertisement may be a percentage of total interactions with the advertisement satisfying an objective associated with the advertisement or with an ad campaign including the advertisement (e.g., a total number of times the advertisement was presented to a user that performed a conversion event associated with the advertisement normalized by a total number of times the advertisement was presented), a number of interactions with the advertisement satisfying the objective associated with the advertisement of with the ad campaign including the advertisement, or any other suitable value. Examples of conversion events associated with an advertisement include presenting the advertisement to a user, receiving a specified type of user interaction with the advertisement when it is presented (e.g., installing an application associated with the advertisement, accessing an object associated with the advertisement, expressing a preference for a page associated with the advertisement, etc.). Thus, an advertisement's performance score increases when a user presented with the advertisement performs a specified type of interaction with the advertisement. Accordingly, an advertisement with a high performance score indicates that presentation of the advertisement advances the objective associated with an ad campaign or with the advertisement.

In one embodiment, the initial performance score associated 310 with an advertisement is based at least in part on an average performance score of advertisements with ad creatives similar to the advertisement's ad creative that were previously presented to social networking system users. In other embodiments, the initial performance score associated 310 with an advertisement is based on an average performance score of advertisements presented to social networking system users and associated with a similar advertiser, a similar topic, a similar objective, similar targeting criteria, or other information similar to information associated with the advertisement or with the ad campaign including the advertisement. In one example, the initial performance score associated 310 with an advertisement has at least a threshold value. For example, the initial performance score associated 310 with an advertisement is determined based on the performance scores associated with advertisements having one or more similar attributes that were previously selected from ad campaigns. Associating 310 an initial performance score having at least a threshold value with an advertisement increases the likelihood of the advertisement being selected from the ad campaign when advertisements are selected based on their associated performance scores. In another example, the initial performance score is set at a value higher than a threshold performance score based on performance scores of previously selected advertisements with similar ad creatives. The initial performance score associated 310 with an advertisement may be stored in the ad campaign store 230 in association with the advertisement.

The social networking system 140 identifies 315 an opportunity to present one or more advertisements to a user of the social networking system 140 via a client device 110. For example, the social networking system 140 receives a request to present an advertisement from a client device 110 associated with a social networking system user. In various embodiments, the client device 110 communicates the request to present an advertisement to the social networking system 140 when the user views or interacts with at least a threshold number of advertisements via the client device 110, when the client device 110 receives a specific type of interaction from a user, when a threshold number of content items are presented to the user via the client device 110, or at least a threshold amount of time lapses between a current time and a time when the user was presented with an additional advertisement. In some embodiments, information identifying 315 the opportunity to present one or more advertisements includes information describing the user to be presented with the advertisement (e.g., a user identifier or other information describing the user) or information describing the context in which an advertisement is to be presented (e.g., a type of the client device 110, additional content presented by the client device 110 along with the advertisement, etc.). Alternatively, the opportunity to present one or more advertisement is identified 315 by the social networking system 140 accessing actions from the action log 220 associated with the user, receiving a request to log into the social networking system from the user, or any other suitable indication of availability. An opportunity may also be identified 315 when a number of ad campaigns in the ad campaign store 230 exceeds a threshold number of ad campaigns or a number of advertisements in the ad campaign store 230 exceeds a threshold number of advertisements.

One or more advertisements are selected 320 from the ad campaign. In one embodiment, an advertisement is selected 320 from the ad campaign based on the initial performance scores associated with advertisements in the ad campaign. For example, an advertisement having a maximum initial performance score is selected 320 from the ad campaign. As another example, one or more advertisements having at least a threshold initial performance score are selected 320 from the ad campaign. Alternatively, if initial performance scores are not associated 310 with advertisements in the ad campaign, one or more advertisements that have not previously been presented to at least a threshold number of social networking system users or that have not received at least a threshold number of interactions from social networking system users are selected 320 from the ad campaign. Additional information may also be used to select 320 one or more of the advertisements included in the ad campaign. For example, information used to select 320 the one or more advertisements may be information associated with the user to be presented with one or more advertisements and targeting criteria associated with advertisements in the ad campaign (e.g., whether the user is associated with one or more characteristics satisfying targeting criteria associated with an advertisement), information associated with the ad campaign from which the advertisement is selected 320, or other suitable information associated with the advertisement, ad campaign, or advertiser.

In another embodiment, the advertisement is randomly selected 320 from the ad campaign. For example, an advertisement that has previously been presented to less than a threshold number of social networking system users is selected 320, such as an advertisement that has not previously been presented to at least one social networking system user. In one embodiment, advertisements in the ad campaign associated with one or more targeting criteria satisfied by a user and that have not been previously presented to social networking system users or that have been presented to less than a threshold number of social networking system users are identified. One or more advertisements are selected 320 at random from the identified advertisements.

The one or more advertisements selected 320 from the ad campaign are included in a set of advertisements evaluated for presentation to one or more social networking system users. In one embodiment, the set includes advertisements from multiple additional ad campaigns as well as the one or more advertisements selected 320 from the ad campaign. For example, the set of advertisements is included in an auction, where the advertisements in the set are ranked based at least in part on the expected values associated with each advertisement in the set. As described above, the bid amount associated with an advertisement affects the expected value associated with the advertisement.

One or more advertisements from the set are identified 325 for presentation and the identified advertisements are communicated 330 to a client device 110 for presentation to the user. For example, if the set of advertisements is included in an auction, advertisements in the set are ranked based on their associated expected value and advertisements having the highest positions in the ranking or having at least a threshold position in the ranking are identified 325 and communicated 330 to the client device 110. Hence, using an auction allows the social networking system 140 to rank advertisements in the set so that advertisements in the set associated with higher expected values have higher positions in the ranking. If an advertisement selected 320 from the ad campaign is identified 325 from the set and communicated 330 to the client device 110, a performance score associated with the advertisement selected 320 from the ad campaign may be increased if the user interacts with the advertisement when it is presented. Similarly, if the advertisement selected 320 from the ad campaign is identified 325 from the set and communicated 330 to the client device 110, but the user does not interact with the advertisement selected 320 from the ad campaign or requests that the advertisement be hidden from display, the performance score associated with the advertisement may be decreased.

Selecting Advertisement Based on Advertisement Bid Amount

Figure 4:
FIG. 4 is a flow chart of a method for selecting an advertisement to evaluate for presentation based in part on a bid amount associated with the advertisement, in accordance with an embodiment.

FIG. 4 is a flowchart of one embodiment of a method for selecting advertisements from an ad campaign for presentation to a user of the social networking system 140. In various embodiments, the steps described in conjunction with FIG. 4 may be performed in different orders. Additionally, in some embodiments, the method may include different and/or additional steps than those shown in FIG. 4. The functionality described in conjunction with the social networking system 140 in FIG. 4 may be provided by the ad exploration module 235, in one embodiment, or may be provided by any other suitable component, or components, in other embodiments. Additionally, the client device 110 may execute one or more instructions associated with the social networking system 140, such as an application associated with the social networking system 140, to provide the functionality described in conjunction with FIG. 4.

As described above in conjunction with FIG. 3, the social networking system 140 receives 305 an ad campaign including a plurality of advertisements. The ad campaign may include an objective, a budget, instructions for allocating the budget among advertisements in the ad campaign, or other suitable information, as described above in conjunction with FIGS. 2 and 3. Each advertisement included in the plurality of advertisements that comprises the ad campaign is associated with a bid amount. As described above in conjunction with FIG. 2, the bid amount associated with an advertisement represents an amount of compensation that an advertiser from which the ad campaign is received 305 provides to the social networking system 140 for presenting the advertisement to one or more users or for one or more users interacting with the advertisement when it is presented.

In one embodiment, the social networking system 140 determines 405 a maximum bid amount from the bid amounts associated with advertisements in the ad campaign. For example, bid amounts associated with each advertisement in the ad campaign are ranked, with the maximum bid amount determined 405 from the ranking. The budget associated with the ad campaign may also be used to determine 405 the maximum bid amount from the ad campaign. For example, a remaining budget associated with the ad campaign is determined based on a difference between the amount of compensation received by the social networking system 140 for presenting advertisements from the ad campaign and the budget associated with the ad campaign. If the maximum bid amount associated with an advertisement in the ad campaign exceeds the remaining budget, an alternative maximum bid amount that is less than or equal to the remaining budget is determined 405. The determined maximum bid amount of advertisements in an ad campaign may be stored in the ad campaign store 230 with an association with the ad campaign.

As described above in conjunction with FIG. 3, the social networking system 140 identifies 315 an opportunity to present one or more advertisements to a user of the social networking system 140 and selects 320 one or more advertisements from the ad campaign for inclusion in a set of advertisements evaluated for presentation to one or more social networking system users. The one or more advertisements may be selected 320 from the ad campaign as advertisements having one or more targeting criteria satisfied by characteristics of the user associated with the opportunity to present the one or more advertisements. However, any suitable criteria may be used to select 320 one or more advertisements from the ad campaign. For example, an advertisement having a specified bid amount or a bid amount within a specified range is selected 320 from the ad campaign for inclusion in the set. As an additional example, performance scores associated with advertisements in the ad campaign are used to select 320 the one or more advertisements from the ad campaign, as described above in conjunction with FIG. 3.

In one embodiment, the social networking system 140 modifies 410 a bid amount associated with an advertisement selected 320 from the ad campaign. For example, the bid amount is modified 410 based at least in part on the budget associated with the ad campaign and the determined maximum bid amount associated with an advertisement in the ad campaign. In one embodiment, the bid amount of the selected advertisement is modified 410 to equal the determined maximum bid amount associated with an advertisement in the ad campaign. In another embodiment, the bid amount associated with the selected advertisement is modified 410 using a pacing multiplier. For example, if the ad campaign is associated with an objective specifying a number of impressions, a pacing multiplier modifies the bid amount associated with advertisements in the ad campaign to spend the budget so the number of impressions specified in the objective occurs over a specified time interval. Other actions may be specified by the objective, with the pacing multiplier used to modify the bid amount of an advertisement or of various advertisements in an ad campaign to satisfy the objective over a specified time interval. The time interval for satisfying an objective may be associated with an advertisement or with the ad campaign by an advertiser. Budget-based advertisement bidding using pacing multipliers is further described in U.S. patent application Ser. No. 13/294,094, filed on Nov. 10, 2011, which is hereby incorporated by reference in its entirety. In another embodiment, the bid amount of an advertisement selected 320 from the ad campaign is modified 410 to an amount that exceeds a bid amount associated with another advertisement having one or more similar characteristics to the selected advertisements and having at least a threshold performance score or having a maximum performance score. The modified bid amount for the advertisement may be stored in the ad campaign store 230 along with an association to the advertisement selected 320 from the ad campaign.

Alternatively, a portion of the ad campaign's budget may be specified by the advertiser for distribution across advertisements in the ad campaign to increase bid amounts associated with various advertisements. In one embodiment, an advertiser specifies a percentage of the budget, and an amount of the budget determined from the percentage is used to increase bid amounts associated with each advertisement in the ad campaign. For example, a percentage of the budget is determined and the percentage of the budget is divided by the number of advertisements in the ad campaign, with the bid amounts of each advertisement increased by the result. Hence, an advertiser may allocate a portion of its specified budget to increase bid amounts associated with various advertisements in the ad campaign. By increasing the bid amounts associated with various advertisements in the ad campaign, the likelihood of an advertisement from the ad campaign being subsequently selected for presentation is correspondingly increased.

One or more advertisements from the set are identified 325 for presentation and the identified advertisements are communicated 330 to a client device 110 for presentation to the user. For example, if the set of advertisements is included in an auction, advertisements in the set are ranked based on their associated expected value and advertisements having the highest positions in the ranking or having at least a threshold position in the ranking are identified 325 and communicated 330 to the client device 110. Hence, using an auction allows the social networking system 140 to rank advertisements in the set so that advertisements in the set associated with higher expected values have higher positions in the ranking. Alternatively, a specified number of advertisements associated with bid amounts equaling or exceeding a threshold value are identified 325.

The one or more identified advertisements from the set are communicated 330 to a client device 110 associated with the user for presentation. In one embodiment, a bid amount associated with the advertisement selected 320 from the ad campaign is increased if the advertisement is identified 325 from the set of advertisements. Alternatively, the bid amount may be increased if the advertisement selected 320 from the ad campaign is presented to a user, if the user performs a specified action after being presented with the advertisement selected 320 from the ad campaign, or if another specified condition occurs. In some embodiments, the bid amount associated with the advertisement may be decreased if the user does not interact with the advertisement after presentation, if the user hides the advertisement from view, or if another action indicating a lack of preference for the advertisement is received from the user.

In some embodiments, after a threshold number of advertisements from an ad campaign have been selected or have been identified for presentation to social networking system users, advertisements are selected based on performance scores associated with advertisements based on received interactions with the advertisements. Alternatively, an advertiser provides an instruction to the social networking system 140 to select advertisements based on received interactions with the advertisement by social networking system users. Hence, an advertiser may use the methods described above to increase the number of advertisements in an ad campaign with which users interact and then subsequently select advertisements from the ad campaign based on the received interactions with various advertisements.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, by a social networking system, an advertisement campaign including a plurality of advertisements for presentation to users of the social networking system, each advertisement in the advertisement campaign having a different ad creative;
associating, for ad creatives with less than threshold number of user interactions, an initial performance score with each advertisement of the plurality of advertisements included in the advertisement campaign using one or more processors of the social networking system, wherein the one or more processors associate the initial performance score with each advertisement from the advertisement campaign by:
  identifying an advertisement from the advertisement campaign;
  identifying advertisements previously presented to one or more social networking system users and having at least one characteristic in common with the identified advertisement from the advertisement campaign;
  determining an average performance score associated with the one or more advertisements based at least in part on performance scores associated with each of the advertisements; and
  associating the average performance score with the identified advertisement from the advertisement campaign, wherein the initial performance score artificially increases the number of user interactions for the identified advertisement;

identifying an opportunity to present one or more advertisements to a user of the social networking system via a client device;

selecting a candidate set of advertisements to be included in an auction process, the candidate set of advertisements including the identified advertisement selected for inclusion in the auction process based at least in part on the initial performance score assigned to the identified advertisement;

sending, by the social networking system, the candidate set of advertisements including the identified advertisement to the auction process to select one or more advertisements for presentation to the user at the identified opportunity;

responsive to the identified advertisement from the advertisement campaign being selected from the candidate set of advertisements in the auction process, transmitting the identified advertisement from the advertisement campaign to the client device operated by the user for presentation at the identified opportunity; and responsive to one or more advertisements other than the identified advertisement from the advertisement campaign being selected from the candidate set of advertisements in the auction process, transmitting the one or more advertisements to the client device operated by the user for presentation at the identified opportunity.

2. The method of claim 1, wherein the advertisement campaign is associated with an objective associated with presenting the one or more advertisements from the advertisement campaign to one or more users of the social networking system.

3. The method of claim 2, wherein selecting an advertisement from the advertisement campaign is further based on a user profile associated with the user by the social networking system and the objective.

4. The method of claim 1, further comprising:
receiving an interaction from a user with an identified advertisement presented to the user; and
modifying an initial performance score associated with the identified advertisement based at least in part on the received interaction.

5. The method of claim 4, wherein the interaction is selected from a group consisting of: presenting the identified advertisement to the user, an interaction with the identified advertisement, an interaction with an object associated with the identified advertisement, and any combination thereof.

6. A method comprising:
receiving, by a social networking system, an advertisement campaign including a plurality of advertisements for presentation to users of the social networking system, each advertisement in the advertisement campaign having a different ad creative;
associating, for ad creatives with less than threshold number of user interactions, an initial performance score with each advertisement of the plurality of advertisements included in the advertisement campaign using one or more processors of the social networking system, wherein the one or more processors associate the initial performance score with each advertisement from the advertisement campaign by:
identifying an advertisement from the advertisement campaign;
identifying advertisements previously presented to one or more social networking system users and associated with an advertiser also associated with the advertisement campaign;
determining an average performance score associated with the advertisements based at least in part on performance scores associated with each of the advertisements; and
associating the average performance score with the identified advertisement from the advertisement campaign, the average performance score being greater than a current performance score for the ad creatives with less than the threshold number of user interactions;

identifying an opportunity to present one or more advertisements to a user of the social networking system via a client device;

selecting a candidate set of advertisements to be included in an auction process, the candidate set of advertisements including the identified advertisement selected for inclusion in the auction process based at least in part on the initial performance score assigned to the identified advertisement;

sending, by the social networking system, the candidate set of advertisements including the identified advertisement to the auction process to select one or more advertisements for presentation to the user at the identified opportunity;

responsive to the identified advertisement from the advertisement campaign being selected from the candidate set of advertisements, transmitting the identified advertisement from the advertisement campaign to the client device operated by the user for presentation at the identified opportunity; and responsive to one or more advertisements other than the identified advertisement from the advertisement campaign being selected from the candidate set of advertisements in the auction process, transmitting the one or more advertisements to the client device operated by the user for presentation at the identified opportunity.

7. The method of claim 6, wherein the advertisement campaign is associated with an objective associated with presenting the one or more advertisements from the advertisement campaign to one or more users of the social networking system.

8. The method of claim 7, wherein selecting an advertisement from the advertisement campaign is further based on a user profile associated with the user by the social networking system and the objective.

9. The method of claim 6, further comprising:
receiving an interaction from a user with an identified advertisement presented to the user; and
modifying an initial performance score associated with the identified advertisement based at least in part on the received interaction.

10. The method of claim 9, wherein the interaction is selected from a group consisting of: presenting the identified advertisement to the user, an interaction with the identified advertisement, an interaction with an object associated with the identified advertisement, and any combination thereof.

11. The method of claim 6, wherein the initial performance score artificially increases the number of user interactions for the identified advertisement.

12. A method comprising:
receiving, by a social networking system, an advertisement campaign including a plurality of advertisements for presentation to users of the social networking system, each advertisement in the advertisement campaign having a different ad creative;
associating, for ad creatives with less than threshold number of user interactions, an initial performance score with each advertisement of the plurality of advertisements included in the advertisement campaign using one or more processors of the social networking system, wherein the one or more processors associate the initial performance score with each advertisement from the advertisement campaign by:
  identifying an advertisement from the advertisement campaign;
  identifying one or more ad creatives previously presented to one or more social networking system users and having at least a threshold number of targeting criteria matching targeting criteria associated with the identified advertisement from the advertisement campaign;
  determining an average performance score associated with the one or more ad creatives based at least in part on performance scores associated with each of the identified one or more ad creatives; and
  associating the average performance score with the identified advertisement from the advertisement campaign, the average performance score being greater than a current performance score for the ad creatives with less than the threshold number of user interactions;
identifying an opportunity to present one or more advertisements to a user of the social networking system via a client device;
selecting a candidate set of advertisements to be included in an auction process, the candidate set of advertisements including the identified advertisement selected for inclusion in the auction process based at least in part on the initial performance score assigned to the identified advertisement;
sending, by the social networking system, the candidate set of advertisements including the identified advertisement to the auction process to select one or more advertisements for presentation to the user at the identified opportunity;
responsive to the identified advertisement from the advertisement campaign being selected from the candidate set of advertisements in the auction process, transmitting the identified advertisement from the advertisement campaign to the client device operated by the user for presentation at the identified opportunity; and
responsive to one or more advertisements other than the identified advertisement from the advertisement campaign being selected from the candidate set of advertisements in the auction process, transmitting the one or more advertisements to the client device operated by the user for presentation at the identified opportunity.

13. The method of claim 12, wherein the advertisement campaign is associated with an objective associated with presenting the one or more advertisements from the advertisement campaign to one or more users of the social networking system.

14. The method of claim 13, wherein selecting an advertisement from the advertisement campaign is further based on a user profile associated with the user by the social networking system and the objective.

15. The method of claim 12, further comprising:
  receiving an interaction from a user with an identified advertisement presented to the user; and
  modifying an initial performance score associated with the identified advertisement based at least in part on the received interaction.

16. The method of claim 15, wherein the interaction is selected from a group consisting of: presenting the identified advertisement to the user, an interaction with the identified advertisement, an interaction with an object associated with the identified advertisement, and any combination thereof.

17. The method of claim 12, wherein the initial performance score artificially increases the number of user interactions for the identified advertisement.

* * * * *